United States Patent
Seo et al.

(10) Patent No.: US 10,947,430 B2
(45) Date of Patent: Mar. 16, 2021

(54) TIRE WITH REDUCED CAVITY NOISE

(71) Applicant: HANKOOK TIRE CO., LTD., Seoul (KR)

(72) Inventors: Byeong Ho Seo, Daejeon (KR); Ju Geon Park, Daejeon (KR); Chang Hwan Kang, Daejeon (KR); Hak Joo Kim, Daejeon (KR)

(73) Assignee: HANKOOK TIRE CO., LTD.

( * ) Notice: Subject to any disclaimer, the term of this patent is extended or adjusted under 35 U.S.C. 154(b) by 325 days.

(21) Appl. No.: 15/917,824

(22) Filed: Mar. 11, 2018

(65) Prior Publication Data

US 2018/0282600 A1    Oct. 4, 2018

(30) Foreign Application Priority Data

Mar. 31, 2017    (KR) .......................... 10-2017-0041701

(51) Int. Cl.
| | |
|---|---|
| *C09J 175/04* | (2006.01) |
| *C09J 171/02* | (2006.01) |
| *C09J 5/04* | (2006.01) |
| *B60C 19/00* | (2006.01) |
| *B60C 1/00* | (2006.01) |

(52) U.S. Cl.
CPC .............. *C09J 175/04* (2013.01); *B60C 1/00* (2013.01); *B60C 19/002* (2013.01); *C09J 5/04* (2013.01); *C09J 171/02* (2013.01); *C09J 2301/504* (2020.08); *C09J 2471/00* (2013.01); *C09J 2475/00* (2013.01); *C09J 2475/008* (2013.01)

(58) Field of Classification Search
CPC ............................ B60C 19/002; C09J 175/08
See application file for complete search history.

(56) References Cited

U.S. PATENT DOCUMENTS

| | | | | |
|---|---|---|---|---|
| 8,642,708 B2* | 2/2014 | Stanjek | ................... | C08L 75/04 |
| | | | | 525/453 |
| 2002/0091222 A1* | 7/2002 | Viegas | ............... | C08G 18/1825 |
| | | | | 528/75 |
| 2012/0107626 A1* | 5/2012 | Schindler | ............. | C08G 65/336 |
| | | | | 428/447 |
| 2012/0136085 A1* | 5/2012 | Choi | ................... | C08G 18/1875 |
| | | | | 521/172 |
| 2013/0032262 A1 | 2/2013 | Bormann et al. | | |

(Continued)

FOREIGN PATENT DOCUMENTS

| | | |
|---|---|---|
| CN | 102471399 A | 5/2012 |
| CN | 106255603 A | 12/2016 |

(Continued)

OTHER PUBLICATIONS

Extended European Search Report for Application No. 18154323.2 dated Aug. 21, 2018.

*Primary Examiner* — Liam J Heincer
(74) *Attorney, Agent, or Firm* — Renaissance IP Law Group LLP

(57) ABSTRACT

Disclosed is a tire with reduced cavity noise including an adhesive agent layer applied to an inside of an inner liner and a sound absorber layer attached to the adhesive agent layer, wherein the adhesive agent layer includes poly(ether-urethane) containing alkoxysilane at both ends thereof. The tire with reduced cavity noise is stable without causing separation of a sound absorber even upon heating and deformation during driving.

3 Claims, 1 Drawing Sheet

(56) References Cited

U.S. PATENT DOCUMENTS

| | | | | |
|---|---|---|---|---|
| 2017/0050474 A1* | 2/2017 | Laubry | ................... | C08J 5/128 |
| 2018/0111427 A1* | 4/2018 | Seo | ........................ | B60C 1/00 |
| 2018/0111428 A1* | 4/2018 | Seo | ........................ | C08L 71/00 |
| 2018/0134933 A1* | 5/2018 | Seo | ........................ | C09J 7/20 |
| 2018/0272815 A1* | 9/2018 | Seo | ...................... | B60C 19/002 |

FOREIGN PATENT DOCUMENTS

| | | |
|---|---|---|
| EP | 2554617 A2 | 2/2013 |
| JP | 2001503097 A | 3/2001 |
| JP | 2005336490 A | 12/2005 |
| JP | 2013032009 A | 2/2013 |
| JP | 2015129280 A | 7/2015 |
| JP | 2015166134 A | 9/2015 |
| JP | 2015526547 A | 9/2015 |
| JP | 2017520447 A | 7/2017 |
| KR | 20110139124 A | 12/2011 |
| KR | 20120023118 A | 3/2012 |
| KR | 20130018578 A | 2/2013 |
| WO | 2013147827 A1 | 10/2013 |
| WO | 2015165899 A1 | 11/2015 |

* cited by examiner

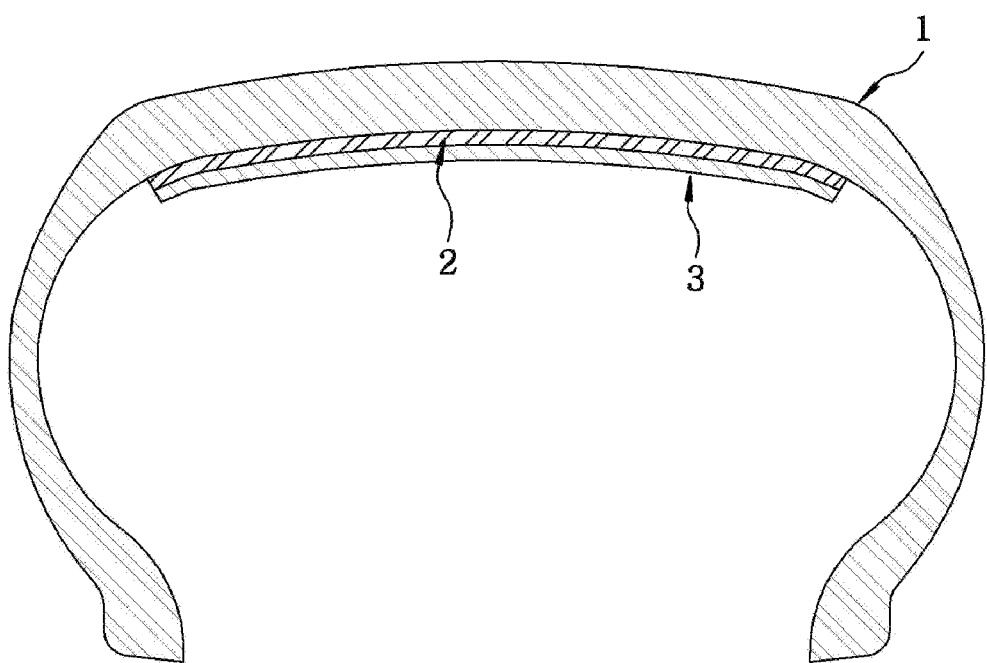

TIRE WITH REDUCED CAVITY NOISE

CROSS-REFERENCE TO RELATED APPLICATION

This patent application claims the benefit of priority under 35 U.S.C. 119 of Korean Patent Application No. 10-2017-0041701, filed on Mar. 31, 2017, the contents of which are hereby incorporated by reference for all purposes as if fully set forth herein.

BACKGROUND

1. Technical Field

The present disclosure relates to a tire with reduced cavity noise that includes an adhesive agent composition with improved elasticity and adhesive strength so that it prevents separation of a sound absorber even upon heating and deformation during driving and is thus stable.

2. Description of the Related Art

With strengthened government regulations on vehicle noise and increasing demand for electric vehicles, the need for reducing noise from tires is gradually increasing. However, with accordance with recent trends towards development of tires, UHP (ultra high performance) tires having a configuration in which a tread contacting tire pavement is formed in a large width and a side wall corresponding to a side surface of the tire has a low aspect ratio are drawing a great deal of attention. In the case of such tires, since the strength of the side wall is increased due to structural properties thereof, the tires cannot normally perform their function of damping shock transferred from the pavement, thus causing an increase in sound pressure related to noise generation. This generates air vibration in a cavity of a tire, so that noise is transferred to the inside of the vehicle and is then detected by a driver, which deteriorates ride comfort (hereinafter, noise due to air vibration will be broadly called "cavity sound").

Conventional technologies to reduce cavity sound include use of polyurethane foams having open cells. However, when a general liquid adhesive agent is used to adhere polyurethane foam to an inner liner inside a tire, the adhesive agent is absorbed in the sound absorber layer, thus disadvantageously leading to problems of significantly reducing sound absorbance and adhesive strength.

The adhesive agent cured by light or heat, instead of a liquid adhesive agent, (JP 2015-166134 A) may have excellent initial adhesive strength, but has low stress such as elasticity and therefore does not endure additional repeatedly applied deformation and vibration, in addition to deformation of tires caused by vehicle load, and is finally broken, which disadvantageously causes detachment or removal of a sound absorber.

When a butyl-based hot-melt adhesive agent is applied, the adhesive agent sufficiently elongates even upon deformation of tires and thus offsets exterior shock. However, as temperature increases, the viscosity of the hot-melt adhesive agent decreases, flowability increases, and the position of the sound absorber attached to a tire may be changed during driving, thus having a negative effect on balance or uniformity of the tire.

Some patents disclose use of silicone-based adhesive agents, but such adhesive agents are disadvantageously vulnerable to high deformation of tires due to low strength.

Therefore, there is a need for use of a specific adhesive agent which can endure deformation and heating of tires in order to attach, to an inner liner, a sound absorber to solve the drawbacks of adhesive agents and reduce cavity sounds of tires.

SUMMARY

Therefore, the present disclosure has been made in view of the above problems, and it is one object of the present disclosure to provide an adhesive agent composition with strong tenacity that can endure deformation and heat generation of tires by improving elasticity and adhesive strength.

It is another object of the present disclosure to provide a tire that can reduce cavity noise generated by air vibration in the tire, which is a kind of noise of the tire, by adhering a sound absorber using an adhesive agent composition with strong tenacity.

It is yet another object of the present disclosure to provide a tire that can maintain the performance of reducing cavity sound until the end of the abrasion lifespan of the tire without detachment or removal of a sound absorber even upon variation in temperature of the tire and deformation by vehicle load or exterior shock during driving, by attaching the sound absorber using an adhesive agent layer with strong tenacity.

In accordance with the present disclosure, the above and other objects can be accomplished by the provision of a tire with reduced cavity noise including an adhesive agent layer applied to an inside of an inner liner, and a sound absorber layer attached to the adhesive agent layer, wherein the adhesive agent layer includes poly(ether-urethane) containing alkoxysilane at both ends thereof.

The poly(ether-urethane) containing alkoxysilane at both ends thereof may be represented by the following Formula 1.

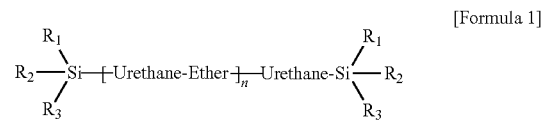

[Formula 1]

Wherein $R_1$ to $R_3$ each independently represent a C1 to C3 alkyl or alkoxy group, and n is an integer of 1 to 10,000.

The ether repeat unit may be an oxypropylene repeat unit represented by the following Formula 2 and the urethane repeat unit may be represented by the following Formula 3.

[Formula 2]

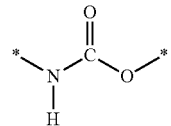

[Formula 3]

The alkoxysilane may be any one selected from the group consisting of mono-alkoxysilane, di-alkoxysilane and tri-alkoxysilane.

The alkoxysilane may be any one selected from the group consisting of methoxysilane, ethoxysilane and propoxysilane.

The compound of Formula 1 may be represented by the following Formula 1a.

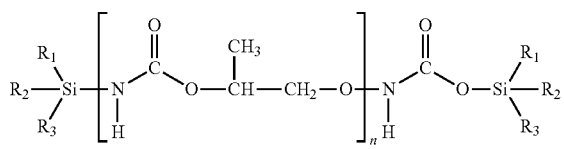

[Formula 1a]

Wherein $R_1$ to $R_3$ each independently represent a C1 to C3 alkyl or alkoxy group, and n is an integer of 1 to 10,000.

A sound absorber of the sound absorber layer may include a polyurethane foam.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a side sectional view of a pneumatic tire according to an embodiment of the present disclosure.

DETAILED DESCRIPTION

Hereinafter, the present disclosure will be described in more detail.

The tire with reduced cavity noise according to an embodiment of the present disclosure includes an adhesive agent layer applied to an inside of an inner liner and a sound absorber layer attached to the adhesive agent layer, wherein the adhesive agent layer includes poly(ether-urethane) containing alkoxysilane at both ends thereof.

The side sectional view of the pneumatic tire according to an embodiment of the present disclosure is shown in FIG. 1. Referring to FIG. 1, the pneumatic tire 1 according to the present disclosure includes an adhesive agent layer 2 applied to an inside surface of an inner liner and a sound absorber layer 3 attached to the adhesive agent layer 2.

The poly(ether-urethane) containing alkoxysilane at both ends thereof included in the adhesive agent layer 2 may be represented by the following Formula 1.

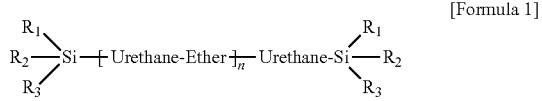

[Formula 1]

Wherein $R_1$ to $R_3$ each independently represent a C1 to C3 alkyl or alkoxy group, and n is an integer of 1 to 1,000.

The ether repeat unit may be oxypropylene represented by the following Formula 2 and the urethane repeat unit may be represented by the following Formula 3.

[Formula 2]

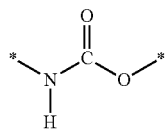

[Formula 3]

The polymer of Formula 1 is composed of poly(ether-urethane), not polyether, as a main chain, so that it has enough strength to endure external force while maintaining constant elasticity.

The polymer of Formula 1 contains an alkoxysilane group as a functional group at both ends thereof, so that crosslinkage can be created between the polymers to improve adhesive strength.

The alkoxysilane may be mono-alkoxysilane, di-alkoxysilane, or tri-alkoxysilane.

The alkoxysilane may contain a C1 to C3 alkoxy group and be preferably any one selected from the group consisting of methoxysilane, ethoxysilane and propoxysilane.

For example, the alkoxysilane is any one selected from the group consisting of methyldimethoxysilane, methyldiethoxysilane, methyldipropoxysilane, methyldibutoxysilane, ethyldimethoxysilane, ethyldiethoxysilane, ethyldipropoxysilane, ethyldibutoxysilane, propyldimethoxysilane, propyldiethoxysilane, propyldipropoxysilane, propyldibutoxysilane, butyldimethoxysilane, butyldiethoxysilane, butyldipropoxysilane, butyldibutoxysilane, dimethylmethoxysilane, dimethylethoxysilane, dimethylpropoxysilane, dimethylbutoxysilane, diethylmethoxysilane, diethylethoxysilane, diethylpropoxysilane, diethylbutoxysilane, dipropylmethoxysilane, dipropylethoxysilane, dipropylpropoxysilane, dipropylbutoxysilane, dibutylmethoxysilane, dibutylethoxysilane, dibutylpropoxysilane, dibutylbutoxysilane, methylethylmethoxysilane, methylpropylmethoxysilane, methylbutylmethoxysilane, methylethylethoxysilane, methylpropylethoxysilane, methylbutylethoxysilane, methylethylpropoxysilane, methylpropylpropoxysilane, methylbutylpropoxysilane, methylethylbutoxysilane, methylpropylbutoxysilane, methylbutylbutoxysilane, trimethoxysilane, triethoxysilane, and tripropoxysilane, but the present disclosure is not limited thereto.

The compound of Formula 1 is more specifically represented by the following Formula 1a.

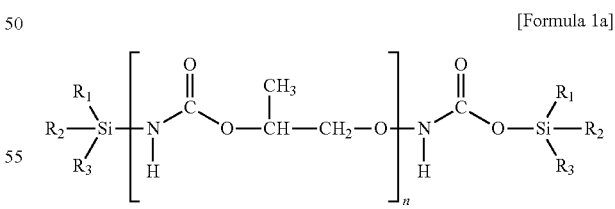

[Formula 1a]

Wherein $R_1$ to $R_3$ each independently represent a C1 to C3 alkyl or alkoxy group, and n is an integer of 1 to 1,000.

The adhesive agent composition containing a poly(ether-urethane) polymer containing alkoxysilane at both ends thereof can maintain the performance of reducing cavity sound until the end of the abrasion lifespan of tires without detachment, separation or removal of sound absorbers even upon deformation by vehicle load or exterior shock or under high temperature as well as low temperature.

The sound absorber layer 3 preferably includes a polyurethane foam as a sound absorber.

The polyurethane foam is basically produced by urethane reaction of a polyisocyanate compound and a polyol (polyhydroxy) compound.

The polyurethane foam refers to a sound absorber which is based on polyurethane having open cells and may have a density of 25 to 35 kg/m$^3$.

The polyurethane foam having open cells is disadvantageously difficult to adhere to an inner liner because an adhesive agent having low viscosity is excessively absorbed in the polyurethane foam. However, since a silicone adhesive agent is absorbed only on the surface of open cells due to high viscosity and elasticity, it secures durability against high deformation without causing deterioration in adhesive strength, thus being suitable for adhesion of a polyurethane foam.

Hereinafter, embodiments of the present disclosure will be described in more detail such that a person having ordinary knowledge in the field to which the present disclosure pertains can easily implement the embodiments. However, the embodiments of the present disclosure can be implemented in various forms and should not be construed as being limited to the embodiments described herein.

[Production Example: Preparation of Adhesive Agent Composition]

An adhesive agent composition was prepared using the composition shown in the following Table 1.

Example 1 exhibits lower elongation (strain) than Comparative Example 1, which means that Example 1 has a potential to prevent detachment of the sound absorber.

The adhesive agent composition according to the present disclosure can endure deformation and heat generation of tires through improved elasticity and adhesive strength.

The tire manufactured using the adhesive agent composition according to the present disclosure can reduce cavity sound, which is tire noise generated by air vibration in the tire, by attaching a sound absorber layer using the adhesive agent composition with strong tenacity.

The tire according to the present disclosure can maintain the performance of reducing cavity sound until the end of the abrasion lifespan of the tire without detachment or removal of a sound absorber even upon variation in temperature of the tire and deformation by vehicle load or exterior shock during driving, by attaching the sound absorber using the adhesive agent layer with strong tenacity.

Although the preferred embodiments of the present disclosure have been disclosed for illustrative purposes, those skilled in the art will appreciate that various modifications, additions and substitutions are possible, without departing from the scope and spirit of the invention as disclosed in the accompanying claims.

What is claimed is:

1. A tire with reduced cavity noise comprising:
an adhesive agent layer applied to an inside of an inner liner; and

TABLE 1

|  | Comparative Example 1 | Example 1 |
|---|---|---|
| Main chain | Polyether polymer | Poly(ether-urethane) polymer |
| Functional group | Methyldimethoxysilane | Methyldimethoxysilane |
| Formula | $H_3CO\!\!-\!\!\underset{H_3CO}{\overset{CH_3}{Si}}\!\!-\!\!\sim\!\!\sim\!\!O\!\!-\!\!(CHCH_2O)_n\!\!-\!\!\sim\!\!\sim\!\!\underset{OCH_3}{\overset{CH_3}{Si}}\!\!-\!\!OCH_3$  n = 1 | $R_2\!\!-\!\!\underset{R_3}{\overset{R_1}{Si}}\!\!-\!\!\left[\underset{H}{N}\!\!-\!\!\overset{O}{\underset{\|}{C}}\!\!-\!\!O\!\!-\!\!\underset{CH_3}{\overset{CH_3}{CH}}\!\!-\!\!CH_2\!\!-\!\!O\right]_n\!\!-\!\!\underset{H}{N}\!\!-\!\!\overset{O}{\underset{\|}{C}}\!\!-\!\!O\!\!-\!\!\underset{R_3}{\overset{R_1}{Si}}\!\!-\!\!R_2$  n = 1 |

Test Example 1

Evaluation of Adhesive Strength

The adhesive agent compositions prepared in Examples and Comparative Examples mentioned above were applied to an inner liner and a sound absorber for tires, followed by adhesion. Physical properties of the resulting structures were measured and are shown in Table 2.

TABLE 2

| Items | Properties | Comparative Example 1 | Example 1 |
|---|---|---|---|
| Tensile properties | Hardness | 25 | 40 |
|  | 100% modulus | 9.2 | 18.4 |
|  | Elongation | 490 | 400 |
| Evaluation of adhesive strength | Peel Test | 25.4 | 42 |

As can be seen from Table 2, Example 1, wherein a poly(ether-urethane) polymer is included as a main chain and an end is modified, exhibits improved hardness and modulus, as well as more improved adhesive strength.

a sound absorber layer attached to the adhesive agent layer, wherein the adhesive agent layer comprises a poly(ether-urethane) containing alkoxysilane at both ends thereof, wherein a sound absorber of the sound absorber layer comprises a polyurethane foam with open cells, and wherein the poly(ether-urethane) containing alkoxysilane at both ends thereof is represented by the following Formula 1a:

[Formula 1a]

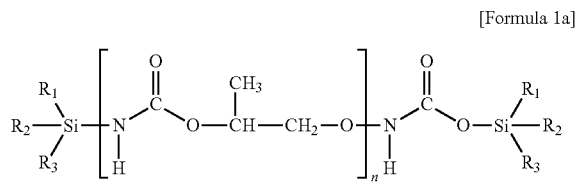

wherein $R_1$ to $R_3$ each independently represent a C1 to C3 alkyl or alkoxy group and n is an integer of 1 to 10,000.

2. The tire according to claim 1, wherein the alkoxysilane is any one selected from the group consisting of mono-alkoxysilane, di-alkoxysilane and tri-alkoxysilane.

3. The tire according to claim 1, wherein the alkoxysilane is any one selected from the group consisting of methoxysilane, ethoxysilane and propoxysilane.

\* \* \* \* \*